United States Patent
Kim (10) Patent No.: US 10,255,321 B2
(45) Date of Patent: Apr. 9, 2019

(54) INTERACTIVE SYSTEM, SERVER AND CONTROL METHOD THEREOF

(71) Applicant: SAMSUNG ELECTRONICS CO., LTD., Suwon-si (KR)

(72) Inventor: Kyoung-min Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 463 days.

(21) Appl. No.: 14/528,009

(22) Filed: Oct. 30, 2014

(65) Prior Publication Data
US 2015/0161204 A1    Jun. 11, 2015

(30) Foreign Application Priority Data
Dec. 11, 2013  (KR) .................. 10-2013-0153696

(51) Int. Cl.
*G06F 17/30* (2006.01)
*G10L 15/26* (2006.01)
*G10L 15/30* (2013.01)

(52) U.S. Cl.
CPC .... *G06F 17/3043* (2013.01); *G06F 17/30654* (2013.01); *G10L 15/26* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 8,200,485 B1 | 6/2012 | Lee | |
| 8,572,649 B1* | 10/2013 | Gossweiler, III | .. H04N 21/4532 725/39 |
| 2003/0154080 A1 | 8/2003 | Godsey et al. | |
| 2003/0182112 A1* | 9/2003 | Manabe | ................ G10L 15/063 704/231 |
| 2003/0216861 A1 | 11/2003 | Sakata | |
| 2006/0004743 A1* | 1/2006 | Murao | ............... H04N 7/17318 |
| 2007/0299822 A1* | 12/2007 | Jopp | ................... G06F 17/3056 |
| 2008/0154612 A1* | 6/2008 | Evermann | ......... H04M 1/72522 704/275 |
| 2009/0271200 A1 | 10/2009 | Mishra et al. | |

(Continued)

FOREIGN PATENT DOCUMENTS

EP    2 453 368 A1    5/2012

OTHER PUBLICATIONS

Communication dated Feb. 27, 2015 issued in International Application No. PCT/KR2014/011167 (PCT/ISA/210/237).

(Continued)

*Primary Examiner* — Richard L Bowen
(74) *Attorney, Agent, or Firm* — Sughrue Mion, PLLC (57) ABSTRACT

An interactive system, an first server and a control method thereof are provided. According to a method for controlling the interactive system, the first server includes storing query data generated by inputting a keyword to a pre-analyzed utterance pattern by an first server, receiving a user's voice, converting the user's voice to voice data and transmitting the voice data to the first server by a display apparatus and in response to the voice data being received, performing a search regarding the user's voice by being the first server using the stored query data.

20 Claims, 6 Drawing Sheets

(56) References Cited

U.S. PATENT DOCUMENTS

| | | | |
|---|---|---|---|
| 2010/0138402 A1* | 6/2010 | Burroughs | G06F 17/30684 |
| | | | 707/706 |
| 2010/0161328 A1 | 6/2010 | Krumel et al. | |
| 2011/0184740 A1 | 7/2011 | Gruenstein et al. | |
| 2012/0054217 A1* | 3/2012 | Clarke | G06F 17/30873 |
| | | | 707/769 |
| 2012/0316876 A1 | 12/2012 | Jang et al. | |
| 2013/0060571 A1* | 3/2013 | Soemo | G10L 15/30 |
| | | | 704/251 |
| 2013/0179173 A1 | 7/2013 | Lee et al. | |
| 2014/0122059 A1* | 5/2014 | Patel | G06F 17/30017 |
| | | | 704/9 |
| 2014/0156279 A1* | 6/2014 | Okamoto | G10L 15/18 |
| | | | 704/257 |
| 2014/0249817 A1* | 9/2014 | Hart | G10L 15/22 |
| | | | 704/239 |
| 2014/0359523 A1* | 12/2014 | Jang | G06F 3/167 |
| | | | 715/781 |
| 2016/0275950 A1* | 9/2016 | Ogawa | G10L 15/10 |

OTHER PUBLICATIONS

Communication dated Dec. 21, 2016, issued by the European Patent Office in counterpart European application No. 14869298.1.
Communication dated Jan. 13, 2017, issued by the European Patent Office in counterpart European application No. 14869298.1.

\* cited by examiner

INTERACTIVE SYSTEM, SERVER AND CONTROL METHOD THEREOF

CROSS-REFERENCE TO RELATED APPLICATION(S)

This application claims priority from Korean Patent Application No. 10-2013-0153696, filed on Dec. 11, 2013, in the Korean Intellectual Property Office, the disclosure of which is incorporated herein by reference, in its entirety.

BACKGROUND

1. Technical Field

Methods and apparatuses consistent with exemplary embodiments relate to an interactive system, an interactive server and a control method thereof. More particularly, the exemplary embodiments relate to an interactive system capable of quickly performing a search regarding a user's voice, an interactive server and a control method thereof.

2. Description of the Related Art

Users wish to use an electronic apparatus more conveniently. Accordingly, a technology for conveniently controlling an electronic apparatus has been developed. The technology for conveniently controlling an electronic apparatus began with a method of controlling an electronic apparatus through an input unit attached in the electronic apparatus, and has been developed into a method of using an external remote controller, which is controllable over a short distance. Since it is common to use a display equipped with a touch panel in an electronic apparatus, a technology which controls an electronic apparatus by a touch input is generally used.

However, the method of controlling the electronic apparatus with a touch input is inconvenient because the user must be within an available distance in order to touch the electronic apparatus. Accordingly, there are growing needs for controlling electronic apparatus by a user within a short distance, without an external apparatus, such as a remote controller.

To control an electronic apparatus through a user's voice, the electronic apparatus must go through some processes such as performing a voice recognition by transmitting the user's voice data to a voice recognition engine when the user's voice is received, and analyzing and searching the user's voice through natural language processing by transmitting the voice recognition result to a dialogue server is provided, and so on.

After a user utters a voice, the user naturally expects instant feedback. However, it takes a long time to go through the processes explained above, resulting in inconvenience to the user.

Therefore, a technology which performs a search related to an uttered voice and quickly providing feedback is required.

SUMMARY

The exemplary embodiments have been made according to the need explained above, and an aspect of the exemplary embodiments provides an interactive system which performs a search related to a user's voice and quickly provides a feedback, an interactive server, and a control method thereof.

A method of controlling an interactive system according to an exemplary embodiment may include storing query data generated by inputting a keyword to a pre-analyzed utterance pattern by an interactive server, receiving a user's voice, converting the user's voice to voice data and transmitting the voice data to the interactive server by a display apparatus and in response to the voice data being received, performing a search related to the user's voice by using the stored query data by the interactive server.

The performing a search may include performing a search with the consistent query data and when data corresponding to a user's voice received from the display apparatus is not consistent with the query data stored in a cache memory of the server in response to data corresponding to a user's voice received from the display apparatus being consistent with the query data stored in a cache memory of the server, and performing natural language processing regarding data corresponding to the received user's voice and performing a search according to a result of the natural language processing.

The utterance pattern may include collecting the user's voice, parsing and analyzing the user's voice.

The storing may include collecting the user's voice, analyzing the utterance pattern by parsing the user's voice and generating the query data by inputting the keyword through an external server, and receiving the query data from the external server and storing the query data in a cache memory through the server.

The external server may perform be configured to analyze the utterance pattern and generating the query data in response to a number of the received user's voice being less than a predetermined number.

The keyword may be a word related to contents generated within a predetermined time period or contents searched more than a predetermined number of times.

The server may include deleting the query data which is not used for the search within a predetermined period of time.

The interactive system, according to an exemplary embodiment, may include a display apparatus configured to receive a user's voice, convert the user's voice to voice data and transmit the voice data to the interactive server, and an interactive server configured to store generated query data by inputting a keyword to a pre-analyzed utterance pattern, and in response the voice data being received, perform a search related to the user's voice by using the stored query data.

The interactive server may include collecting the user's voice, parsing the user's voice and analyzing the utterance pattern.

The interactive server may further include an external server, and the external server may be configured to collect the user's voice, analyze the utterance pattern by parsing the user's voice, generate the query data by inputting the keyword and transmit the query data to the interactive server, and the interactive server may be configured to include receiving the query data from the external server and storing the query data in a cache memory.

The external server may include analyzing the utterance pattern and generating the query data in response to a number of the received user's voice being less than a predetermined number.

The keyword may be a word related to contents generated within a predetermined period of time or contents searched more than a predetermined number of times.

The interactive server may include, in response to the voice data being consistent with the stored query data in the cache memory performing a search with the consistent query data, and in response to the voice data not being consistent with the stored query data in the cache memory, performing a natural language processing with the voice data and performing a search according to the result of the natural language processing.

The interactive server may be configured to include deleting the query data which is not used for the search within a predetermined period of time.

A method of controlling the interactive server according to an exemplary embodiment may include storing query data which is generated by inputting a keyword to the pre-analyzed utterance pattern, in response to data which corresponds to the user's voice being received and the data is consistent with the stored query data, determining whether the data is consistent with the stored query data, and in response to data which corresponds to the received user's voice being consistent with the stored query data, performing a search with the stored query data, and in response to data which corresponds to the received user's voice not being consistent with the stored query data, performing natural language processing with data corresponding to the received user's voice and performing a search according to the result of the natural language processing.

The interactive server, according to an exemplary embodiment, may include a storage configured to store query data generated by inputting a keyword to a pre-analyzed utterance pattern, a communicator, and a controller configured to perform a search with the stored query data when data corresponding to the received user's voice is consistent with the stored query data, in response to data corresponding to a user's voice is received through the communicator, by determining whether the received voice data is consistent with the stored query data, and perform natural language processing and perform a search according to the result of the natural-language processing when the data is not consistent with the received user's voice.

According to various aspects of an exemplary embodiment, an interactive system configured to quickly perform a search related to the user's voice, control method thereof, and an interactive server are provided.

An aspect of an exemplary embodiment may provide an interactive system, wherein the external server is configured to compare the stored query data by inputting a keyword to a pre-analyzed utterance pattern, and in response to the voice data being received, perform a search related to the user's voice by using the stored query data.

The external server may be further configured to analyze the utterance pattern and generate the query data in response to a number of the received user's voice being less than a predetermined number.

The keyword may be a word related to contents generated within a predetermined period of time or contents searched more than a predetermined number of times.

The interactive server may be configured to delete the query data which is not used for the search within a predetermined period of time.

DETAILED DESCRIPTION OF THE EXEMPLARY EMBODIMENTS

Hereinafter, exemplary embodiments will be described in greater detail with reference to the accompanying drawings. In explaining the exemplary embodiments, if it seems that a detailed explanation regarding a related art or configuration obscures a substance of the exemplary embodiments with unnecessary detail, the detailed explanation thereof is omitted. Terms used below are justified in accordance with a function of the exemplary embodiments, and these may change according to an intention of a user and an operator, and customs. Therefore, the justification should be made through the overall specification of the exemplary embodiments.

Herein below, 'the first server' in the claims refers to 'interactive server', and 'the second server' in the claims refers to 'external server'.

Figure 1:
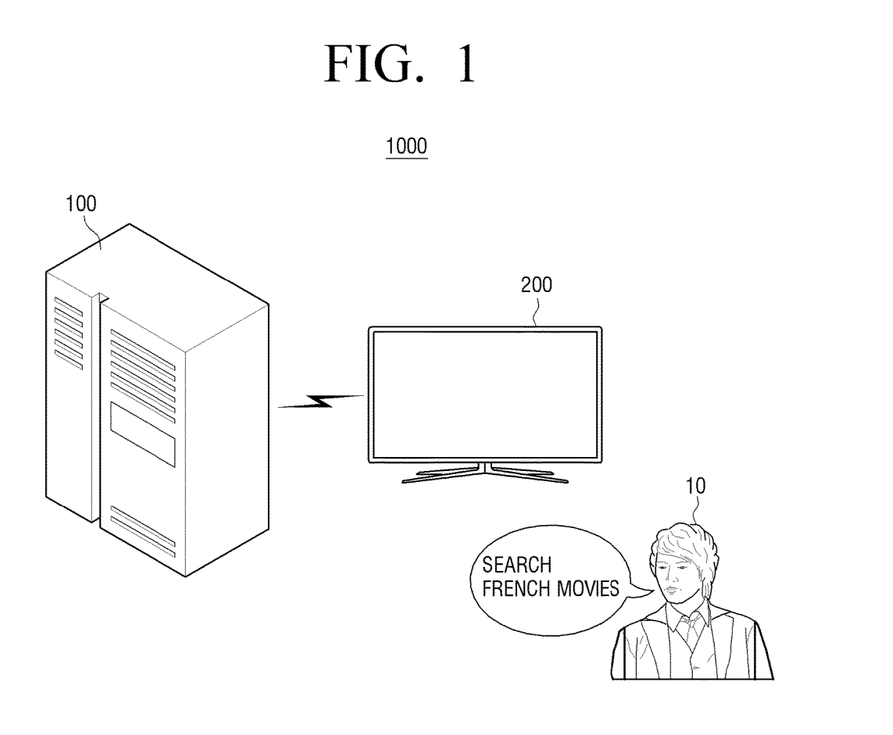
FIG. 1. is a diagram which illustrates an interactive system, according to an exemplary embodiment.

FIG. 1 is a diagram which exemplary illustrates an interactive system 1000 according to an embodiment. The interactive system 1000 may include an interactive server 100 and a display apparatus 200.

The interactive server 100 may perform a search regarding a user 10's voice in response to data corresponding to the user's voice being received. Also, the interactive server 100 may recognize the user's voice and perform a search by converting the user's voice to text data.

The interactive server 100 may receive the user's voice or data which corresponds to the user's voice and may perform voice recognition.

The interactive server 100 may perform natural language processing, analyze the data which recognized the voice, and transmit the search result to the display apparatus 200.

For example, in response to a determination that the user's voice for searching French movies is received as illustrated in FIG. 1, the interactive server 100 searches for French movies from a storage in the interactive server 100 and transmits the information obtained from the search, regarding French movies, to the display apparatus 200 for displaying through a User Interface (UI).

In response to a determination that the user's voice has a plurality of meanings, the interactive server 100 may transmit the plurality of results to the display apparatus 200 so that the user may select an accurate result.

The display apparatus 200 may receive a user's voice and transmit the user's voice to the interactive server 100. In response to an Auto Speech Recognition (ASR) engine being equipped with the display apparatus 200, the display apparatus 200 may receive the user's voice, recognize the user's voice, convert the user's voice to a text and transmit the converted text to the interactive server 100.

As illustrated in FIG. 1, the display apparatus 200 may be implemented as a television. However, it may be embodied in various kinds of electronic apparatuses, including a display such as a cell phone, a tablet PC, a digital camera, a camcorder, a laptop computer, or a Personal Digital Assistant (PDA), and may not even include a display, as it may be embodied in various kinds of electronic apparatuses equipped with a function which can receive the user's voice and output the result of the voice recognition.

The display apparatus 200 may include a microphone, receive the user's voice and convert the received user's voice to user's voice data. Also, the display apparatus 200 may receive data corresponding to the user's voice in a text form.

The display apparatus 200 may transmit the converted user's voice data or the received data in a text form to the interactive server 100.

The display apparatus 200 may receive the voice recognition result processed in the interactive server 100 and output the result through a speaker, or display the result through the display. For example, as illustrated in FIG. 1, in response to a user's voice to search French movies being received through the display apparatus 200, the interactive server 100 which received voice data corresponding to the received user's voice performs a search regarding French movies, and the display apparatus 200 receives a search result, the search result may be displayed through the display. In response to the user's instruction to play one of the searched French movies being inputted from the user, the display apparatus 200 may perform a motion which corresponds to the inputted user instruction.

Unlike the illustration in FIG. 1, the interactive server 100 may not exist separately outside of the display apparatus 200, and may be included in the display apparatus 200.

The interactive server 100 may include a plurality of servers. For example, the interactive server 100 may include the ASR server for voice recognition, a server for the natural language processing and a server for collecting and analyzing the voice recognition, and generating query data.

Figure 2:
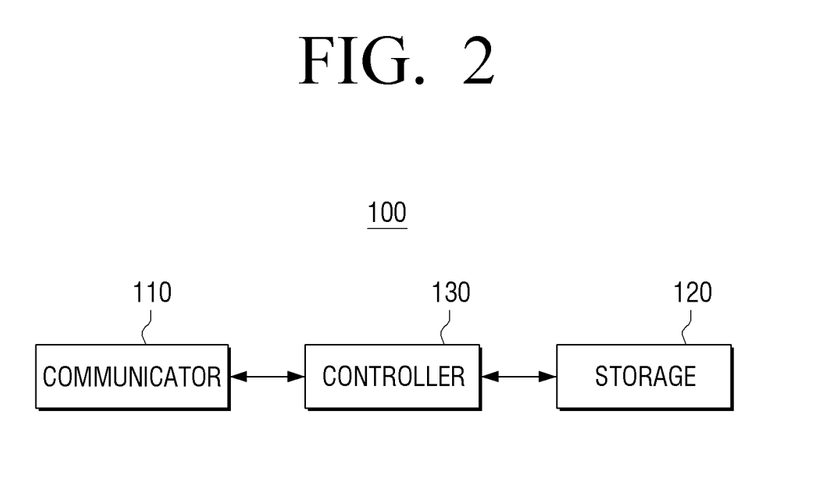
FIG. 2. is a block diagram which illustrates a configuration of an interactive server, according to an exemplary embodiment.

FIG. 2 is a block diagram which illustrates a configuration of the interactive server 100 according to an exemplary embodiment. As illustrated in FIG. 2, the interactive server 100 includes a communicator 110, a storage 120, and a controller 130.

The communicator 110 is a configuration for performing communication with an external apparatus or an external server. As illustrated in FIG. 1, in response to the display apparatus 200 and the interactive server 100 performing communication, the communicator 110 may receive the converted voice data from the display apparatus 200, and may transmit to the display apparatus 100 the searched result related to the voice data analyzed by the interactive server 100.

In response the external server of the interactive server 200 existing, the communicator 110 may transmit or receive various data by performing communication with the external server.

The storage 120 is a configuration which stores various software modules and data for driving the interactive server 100. For example, the storage 120 may store software including the ASR engine module, a dialogue engine module and a log analysis module.

The ASR engine module stored in the storage 120, which is executed by the controller 130, may recognize the voice received from the display apparatus 200 and convert the received voice to a text which matches with a database.

The dialogue engine module may perform a natural language processing regarding the voice recognition result, and may perform a search according to the performed result.

The log analysis module may be performed by a controller 130, may collect the user's voice and analyze an utterance pattern by parsing the user's voice. Further, the log analysis module may collect a keyword.

The keyword may be a word related to contents generated within a predetermined period or contents searched more than a predetermined number. Specially, the keyword may be a word related to contents, such as newly released movie titles, drama titles, various performances, producers of a movie or a drama, directors, writers, characters, performing actors, exhibition titles, painters of the exhibitions, shows, newly produced games or words ranked in a searching word list of a search engine within a predetermined period of time.

The log analysis module may generate query data by inputting the keyword to the analyzed utterance pattern. A specific method of generating the query data is explained below.

The storage 120 may store a result of the natural language processing. To be specific, in response to the natural language processing being performed to the received user's voice by a control of the controller 130, the storage 120 may store the result of the natural language processing. For example, when a user's voice, "show me entertainment shows where K appears," is received and the natural language processing is performed, the storage 120 may store the result of the natural language processing. Accordingly, in response to the same user's voice is received again from the user, the search may be performed quickly by using the result of the natural-language processing stored in the storage 120.

The storage 120 may include a cache memory. The cache memory may store the result of the natural language processing used within a predetermined period of time or the processing result regarding the user's voice frequently received from the user and may quickly perform a search according to the user's voice.

The controller 130 is a configuration for controlling overall motions of the interactive server 100. In response to the user's voice being received from an external apparatus such as the display apparatus 200, and in response to the ASR server being equipped with the ASR module or the interactive server 100, the controller 130 may control the user's voice to be converted to text data through the ASR server.

The controller 130 may determine whether the analyzed result regarding the converted data pre-exists based on the stored data in the storage 120. In response to the analyzed result being pre-stored as a result of the determination, the controller 130 may perform a search with the stored data.

In response to a determination that the analyzed result regarding the converted data does not exist in the storage 120, the controller 130 may perform natural language processing with the converted data, and perform a search according to the result of the natural-language processing.

The controller 130 may control to analyze the user's voice utterance pattern, generate query data, and store the generated query data. The controller 130 may collect and parse the user's voice, and analyze the user's voice utterance pattern. For example, in response to voices such as "search Happy Weekends," "search Music World," "search Die Hard," and so on, are collected from a plurality of users, the controller 130 may determine that the collected voices have a pattern of 'content title'+'search' by parsing the collected voices.

The controller 130 may collect a keyword. The keyword may be a word related to contents generated within a predetermined period of time or contents searched more than a predetermined number of times. To be specific, the keyword may be a word related to contents such as newly released movie titles, drama titles, various performances, producers of a movie or a drama, directors, writers, characters, performing actors, exhibition titles, painters of the exhibitions, shows, newly produced games, or words ranked in a searching word list of a search engine within a predetermined period.

The controller 130 may input the collected keyword to the analyzed result of the utterance pattern and generate query data. As the examples described above, in response to a determination, by collecting the user's voice, that the user's voice has the pattern of 'content title'+'search', the controller 130 may generate the query data by inputting various content titles such as a movie, a drama, a performance, and so on, among the collected keywords to the 'content title', and may store the generated query data. For example, in response to the predetermined period being a week, and key words 'A', 'B', 'C', and 'D' are collected because movies 'A', 'B', 'C', and 'D' were released in a week from the day when the keyword is collected, the controller 130 may generate the query data 'search A,' 'search B,' 'search C,' and 'search D,' and may store the query data in the storage 120.

In response to the voice, 'search A', being received from the communicator 110, the controller 130 may determine that the voice is the same as the voice, 'search A,' which is stored in the storage 120 and may perform a search.

The analysis of an utterance pattern and collecting of keywords, as explained above may be performed in each module stored in the storage 120, and also may be performed in an internal server which exists in the interactive server 100 and an external server which exists outside of the interactive server 100.

In response to the external server analyzing the utterance pattern by collecting and parsing the user's voice, and generating the query data by inputting the collected keywords, the interactive server 100 may receive the query data which the external server generates through the communicator 110, and may store the query data in the memory cache.

In response to the query data being generated in the external server or the interactive server 100, the analysis of the utterance pattern and the generation of the query data may be performed at the time when the received user's voices are received less than a predetermined number of times. At the time when there are many received user's voices, the natural language processing and the search may be performed, and at the time when there are less received user's voices, the query data may be generated. For example, the external server or the interactive server 100 may generate and store the query data in advance, based on the user's voice pre-collected early in the morning.

The interactive server 100 may delete the query data which is not used for a search within a predetermined period of time from among the query data stored in the storage 120.

Through the interactive system explained above, the user may be quickly provided by the display apparatus with feedback related to which the uttered user's voice.

Figure 3:
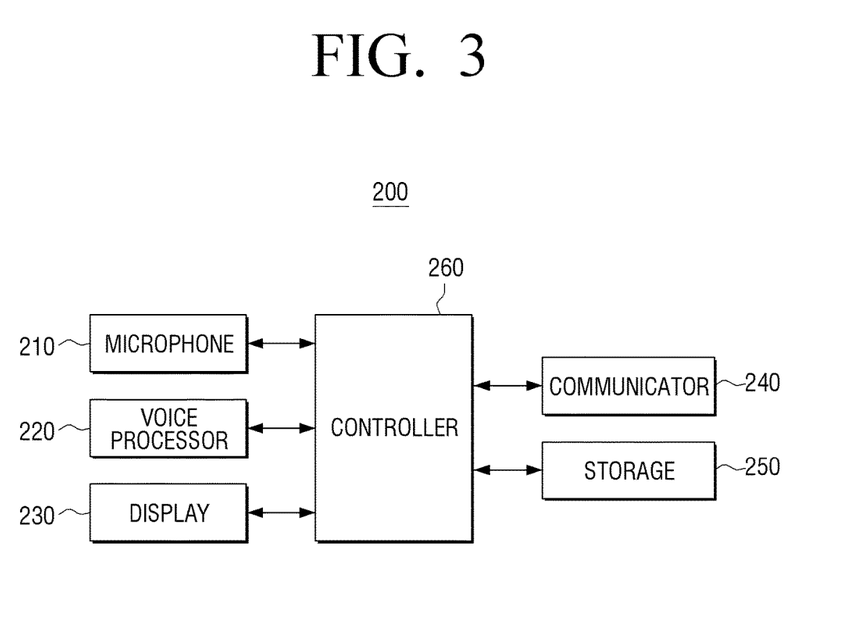
FIG. 3. is a block diagram which illustrates a configuration of a display apparatus, according to an exemplary embodiment.

FIG. 3 is a block diagram which illustrates a configuration of the display apparatus 200, according to an exemplary embodiment. The display apparatus 200 may include a microphone 210, a voice processor 220, a display 230, a communicator 240, a storage 250 and a controller 260. FIG. 3 comprehensively illustrates various configurations by example of a case where the display apparatus 200 is an apparatus with various functions such as a voice receive function, a voice recognition function, a voice recognition result output function, a communication function, a video playback function, a display function, and so on. Therefore, according to an exemplary embodiment, a part of the configurations illustrated in FIG. 3 may be deleted or changed, or other configurations may be added.

The microphone 210 is a configuration for receiving a user's voice. The display apparatus 200 may receive a user's voice, over a long distance through the microphone 210.

The voice processor 220 is a configuration for processing a received user's voice to data in a text form. The voice processor 220 may recognize a voice and convert the voice to a text which matches the database.

The display 230 is a configuration for displaying contents. The display 230 may display broadcast contents received through broadcast channels. The display apparatus 200 may receive various broadcast signals that the broadcast company transmits through Radio Frequency (RF) communication network, may receive contents through IP networks from various servers, and the display 230 may display the received contents.

The display 230 may display a UI related to a voice recognition function. For example, in response to the user's voice, "search French movies," being received through the microphone 210, and in response to the interactive server 100 analyzing the received user's voice, searches French movies, and receives the search result from the interactive server 100, the display 230 may display the information regarding the searched French movies. That is, the display 230 may display a title, released year, a director, a writer, a leading actor of the searched French movies, and the user's instruction may be inputted to check the results or play one of the plurality of displayed movies.

The communicator 240 is a configuration for performing communication with various types of external apparatuses according to various types of communication methods. In particular, the communicator 240 may perform communication with the interactive server 100. For example, the communicator 240 may transmit to the interactive server 100, the user's voice received from the display apparatus 200, or the converted voice data, and may receive from the interactive server 100 the search result regarding the analyzed voice data.

The storage 250 is a configuration for storing various software modules and data in order to drive the display apparatus 200. For example, the software including a base module, a sensing module, a communication module, a presentation module, a web browser module, and a service module may be stored in the storage 250.

The storage 250 may store the result of the user's voice converted to a text in the display apparatus 100. The storage 250 may store the result of the natural language processing received from the interactive server 100 or may store the search results according to the result of the natural language processing. For example, the storage 250 may store the converted data of the user's voice which is determined to be received more than a predetermined number of times or the search result regarding the user's voice.

The storage 250 may include a cache memory. The result of the natural language processing used within a predetermined period or the processing result regarding the user's voice, frequently received from the user, may be stored in the cache memory and voice processor 220 may quickly perform a search according to the user's voice.

The controller 260 is a configuration for controlling overall motions of the display apparatus 200. The controller 260, by converting the received user's voice to text data, may determine whether the search result of the converted text data is stored in the storage 250. In response to a determination that the search result of the text data is not stored in the storage 250, the controller 260 may control to transmit the user's voice or the converted text data of the user's voice to the interactive server 100 through communicator 240. In response to the search result regarding the user's voice being received from the interactive server 100, the controller 260 may control to display the search result through the display 230.

Figure 4:
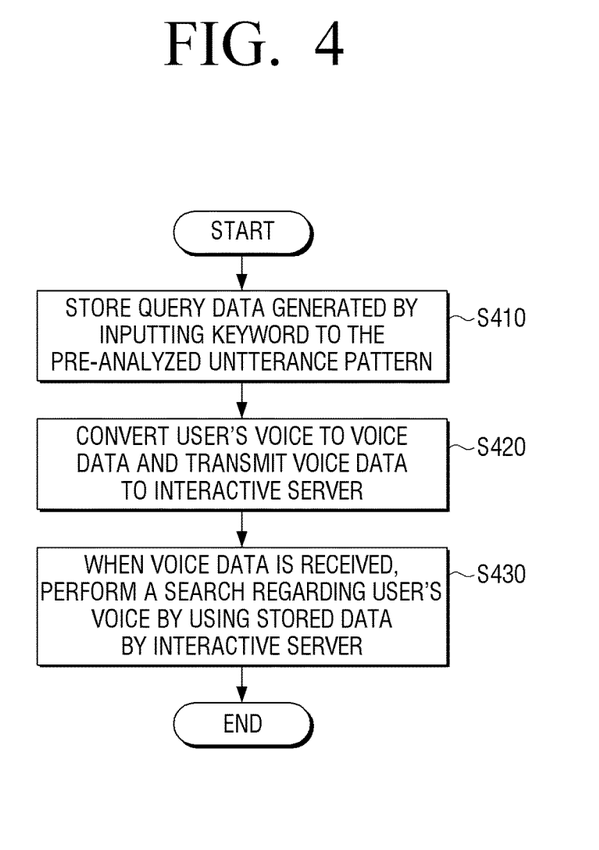
FIG. 4. is a flowchart which explains a method of controlling an interactive system, according to an exemplary embodiment.

FIG. 4 is a flowchart explaining a method for controlling the interactive system, according to an exemplary embodiment.

The interactive server 100 may store the query data generated by inputting the keyword to the pre-analyzed utterance pattern (S410). The interactive server 100 may collect the user's voice and analyze the utterance pattern by parsing the user's voice. The interactive server 100 may collect the keyword and generate the query data by inputting the keyword to the utterance pattern.

The keyword may be a word related to contents generated within a predetermined period of time or contents searched more than a predetermined number of times. To be specific, the keyword may be a word related to contents such as newly released movie titles, drama titles, various performances, producers of a movie or a drama, directors, writers, characters, performing actors, exhibition titles, painters of the exhibitions, shows, newly produced games, or words ranked in a searching word list of a search engine within a predetermined period of time.

For example, in response to a voice such as "search Happy Weekends," "search Music World," "search Die Hard," and so on being collected from a plurality of users, the interactive server 100 may parse the collected voices and determine that the collected voices have a pattern of 'content title'+'search.'

The interactive server 100 may generate query data by inputting various content titles such as a movie, a drama, a performance and so on among the collected keywords to the 'content title', and may store the generated query data. For example, in response to the predetermined period is a week, and key words, 'A', 'B', 'C', and 'D' are collected because movies 'A', 'B', 'C', and 'D' were released in a week from the day when the keyword is collected, the interactive server 100 may generate the query data such as 'search A,' 'search B,' 'search C,' and 'search D' by inputting the collected keywords to the utterance pattern, and may store the query data. The interactive server 100 may also store the query data to the cache memory.

The display apparatus 200 may receive the user's voice, convert the user's voice to the voice data and transmit the voice data to the interactive server 100 (S420). The display apparatus 200 may receive the user's voice through the microphone, convert the user's voice to the text data and transmit the user's voice to the interactive server 100. In response to the display apparatus 200 does not include a module for converting the user's voice to the text data, the user's voice may be transmitted to the interactive server 100. Also, the display apparatus 200 may transmit the user's voice to the external ASR engine.

In response to the voice data being received, the interactive server 100 may perform a search regarding the user's voice by using the stored query data (S430). To be specific, in response to the voice data being the same as the query data stored in the cache memory of the interactive server 100, the interactive server may perform a search with the same query data. In response to the voice data not being the same as the query data, the interactive server 100 may perform natural language processing regarding the data corresponding to the received user's voice and perform a search according to the result of the natural-language processing.

That is, even though the voice, "search A," has not been received from the user, since the query data, "search A", is pre-generated and stored, the interactive server 100 may perform a search regarding 'A' without separate processes such as the natural language processing, and so on, in response to the voice, "search A," being receive from the user for the first time.

The interactive server 100 may delete the query data which is not used for the search within a predetermined period of time.

Figure 5:
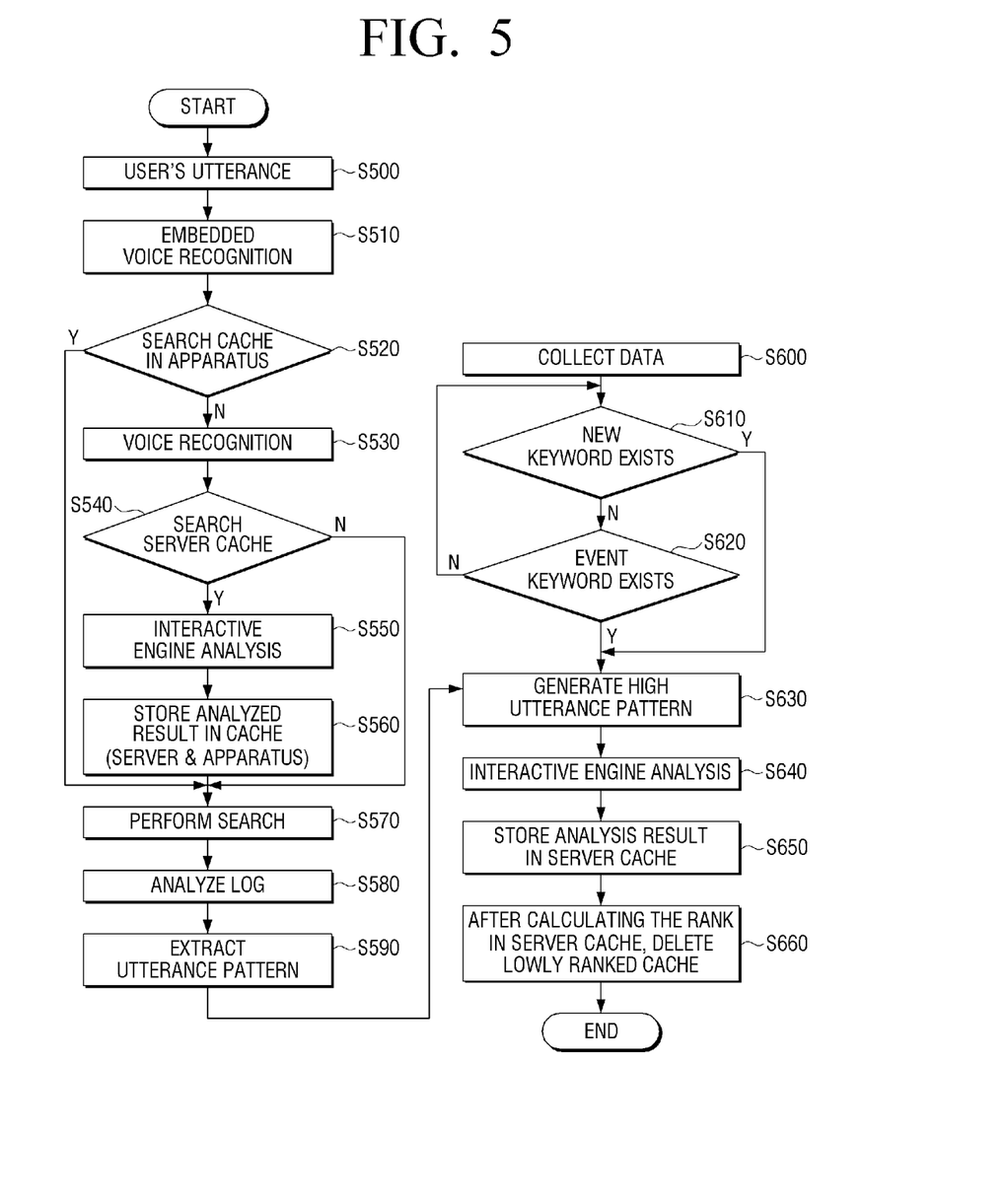
FIG. 5. is a flowchart which explains a method of controlling an interactive system according to an exemplary embodiment.

FIG. 5 is a detailed flowchart explaining a method of controlling the interactive system, according to an exemplary embodiment.

In response to the user's utterance being inputted through the display apparatus 200, (S500), and the display apparatus 200 including an embedded ASR engine, the display apparatus 200 performs an embedded voice recognition regarding the inputted user's utterance (S510). In response to the user's utterance voice being converted to the text data by the embedded voice recognition, a search regarding the cache memory in the display apparatus 200 is performed (S520). In response to the analysis result regarding the user's utterance voice existing in the cache memory of the display apparatus 200 (S520-Y), the display apparatus 200 may perform the search based on the analysis result and may output the search result (S570).

For example, in response to the user's voice, "search French movies," being received, and the search results regarding the French movies are stored in the cache memory of the display apparatus 200, the display apparatus 200 may display the information regarding the searched French movies. That is, the display apparatus 200 may display a title, released year, a director, a writer, a leading actor of the searched French movies, and user's instruction may be inputted to check the results or to play one of the plurality of movies which were displayed.

However, in response to the voice recognition result not being pre-stored in the cache memory of the display apparatus 200 (S520-N), the display apparatus 200 may transmit the user's voice or the converted user's voice data to the interactive server 100.

Accordingly, in response to the interactive server 100 recognizing the voice (S530), the interactive server 100 may search whether the analysis result regarding the recognized voice exists in the cache memory of the server (S540).

In response to a determination that the analysis result regarding the user's voice exists in the cache memory (S540-Y), the interactive server 100 may perform an interactive engine analysis (S550). The interactive server 100 may analyze the user's voice by performing the natural-language processing, and so on.

The interactive server 100 may store the analyzed result in the cache memory of the interactive server 100 and the display apparatus 200 (S560). In response to the same voice being received from the user, the interactive server 100 may store the analysis result regarding the user's voice in the cache memory in order to quickly perform a search corresponding to the user's voice. The interactive server 100 may transmit the analysis result regarding the user's voice to the display apparatus 200, and store the analysis result which the display apparatus 200 received in the cache memory.

The interactive server 100 performs a search after finishing the interactive engine analysis regarding the user's voice (S570). For example, in response to the user's voice, "search French movies," being received, and the user's voice is determined as an input to search French movies through the interactive engine analysis by recognizing the user's voice, the interactive server 100 may search for French movies.

In response to receipts of the user's voice being repeated and a plurality of the user's voices being collected, the interactive server 100 performs a log analysis (S580). The interactive server 100 may collect the user's voice, analyzes the utterance pattern by parsing, and perform the log analysis by analyzing the utterance pattern. An utterance pattern may be extracted after performing log analysis (S590).

The interactive server 100 collects various kinds of data (S600). The interactive server 100 may collect various kinds of data by performing web crawling, meta-data feeding, and so on.

The interactive server 100 determines whether a new keyword exists from the collected data (S610). The new keyword may include a word related to contents such as newly released movie titles, drama titles, various performances, producers of a movie or a drama, directors, writers, characters, performing actors, exhibition titles, painters of the exhibitions, shows, newly produced games, and so on, within a predetermined period of time.

In response to a determination that the new keyword exists (S610-Y), the interactive server 100 generates a high utterance pattern (S630). The high utterance pattern may be query data generated by inputting the new keyword to the analyzed utterance pattern.

In response to a determination that the new keyword does not exist (S610-N), the interactive server 100 may determine whether an event keyword exists (S620). The event keyword may be a word that a plurality of users used on internet within a short period of time such as a word ranked in a search word list of a search engine within a predetermined period of time.

In response to a determination that the event keyword exists (S620-Y), the interactive server 100 may generate a high utterance pattern (S630). The high utterance pattern may be query data generated by inputting the event keyword to the analyzed utterance pattern.

The keyword extraction and the query data generation through the log analysis and data collection may be performed through the external server of the interactive server 100. In response to the query data being generated from the external server, the interactive server 100 may receive the query data from the external server and store the query data in the cache memory.

In response to the high utterance pattern such as the query data being generated by inputting the new keyword or the event keyword, the interactive server 100 may perform an analysis of the interactive engine (S640). Then the analysis result according to the interactive engine analysis is stored in the cache memory of the server (S650).

The interactive server 100 may delete lowly ranked cache by calculating the rank in the cache of the server (S660). The interactive server 100 may periodically calculate the frequency of use in response to the query data stored in the cache memory for search being the same as the received user's voice. In response to a determination that the frequency of the use is low, the interactive server 100 may calculate the rank to be lowly. Since the lowly ranked data may be deemed that the frequency of use for search is low, the interactive server 100 may delete the lowly ranked query data.

Figure 6:
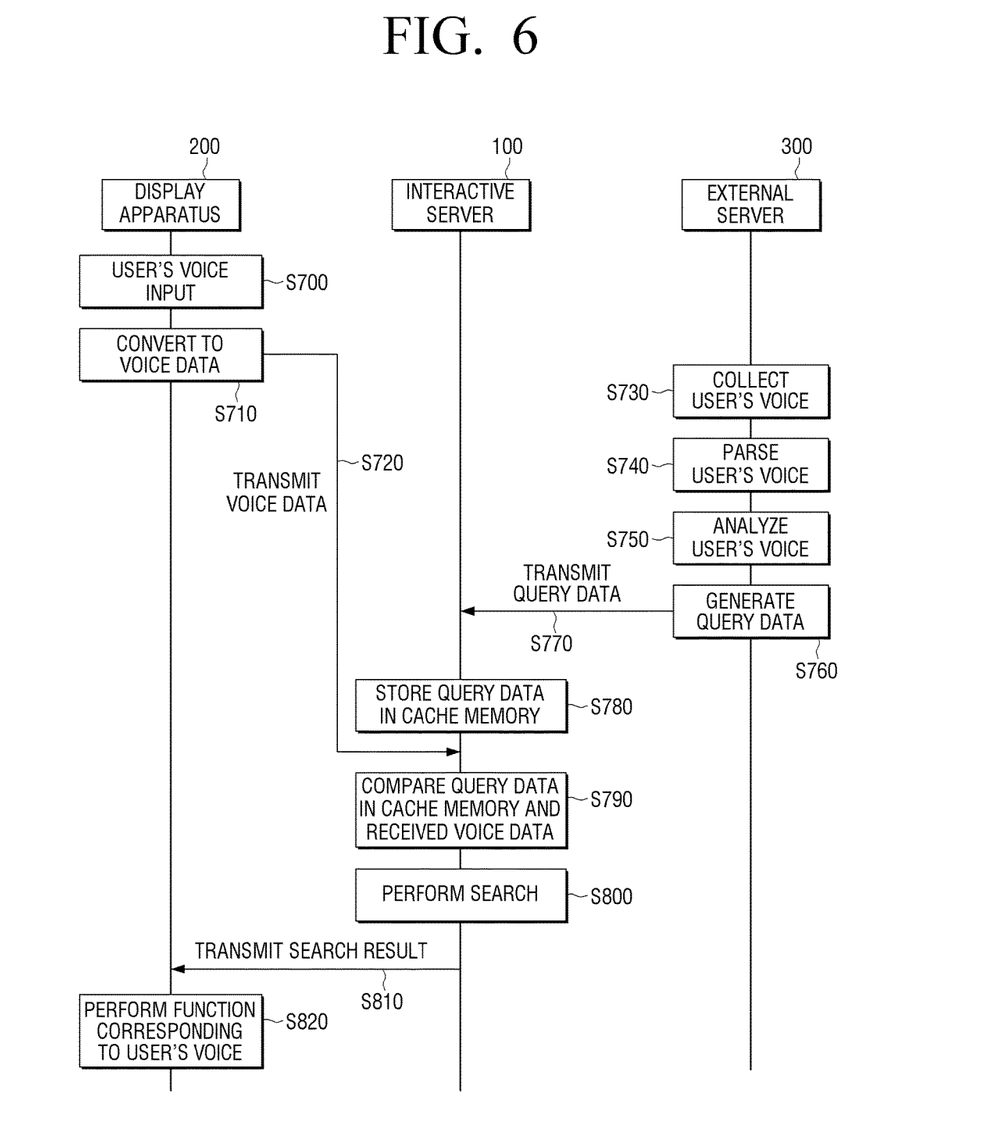
FIG. 6. is a sequence diagram which explains a method of controlling an interactive system, according to an exemplary embodiment.

FIG. 6 is a sequence diagram which explains a method of controlling the interactive system, according to an exemplary embodiment. FIG. 6 may explain a method of controlling the interactive system in response to a generation of the query data being performed in the external sever 300 of the interactive server 100.

First, the user's voice is inputted (S700), and the display apparatus 200 converts the voice to the voice data (S710).

The external server 300 may collect the user's voice (S730), parse the user's voice (S740) and analyze the user's voice (S750). The external server 300 may detect the utterance pattern by analyzing the user's voice. For example, in response to the voice such as "search Happy Weekends," "search Music World," "search Die Hard," and so on, being collected from a plurality of users, the external server 300 may determine that the collected voices have a pattern of 'content title'+'search' by parsing the collected voices.

The external server 300 may collect various kinds of data by performing web crawling or meta-data feeding, and so on, and extract a keyword from the collected data.

The keyword may be a word related with contents generated within a predetermined period of time or contents searched more than a predetermined number of times. To be specific, the keyword may be a word related with contents such as newly released movie titles, drama titles, various performances, producers of a movie or a drama, directors, writers, characters, performing actors, exhibition titles, painters of the exhibitions, shows, newly produced games or words ranked in a searching word list of a search engine within a predetermined period.

The external server 300 generates query data by inputting the extracted keyword to the analyzed utterance pattern (S760). The external server 300 may transmit the generated query data to the interactive server 100 (S770).

As the example explained above, in response to the pattern of 'content title'+'search' is determined by collecting the user's voice, the external server 300 may generate query data by inputting various titles of a content such as a movie, a drama, a performance, and so on, among the collected keywords to the 'content title.' For example, in response to the predetermined period being a week, and key words 'A,' 'B,' 'C,' and 'D' are collected because movies 'A,' 'B,' 'C,' and 'D' were released in a week from the day when the keyword is collected, the external server 300 may generate the query data 'search A,' 'search B,' 'search C,' and 'search D' by inputting the collected keyword to the utterance pattern, and may transmit the query data to the interactive server 100.

The interactive server 100 stores the query data received from the external server 300 in the cache memory (S780). In response to the voice data being transmitted from the display apparatus 200 (S720), the interactive server compares the query data in the cache memory and the received voice data (S790), and performs a search according to the result of the comparison (S800).

In response to the analysis result of the received voice data being stored in a memory cache as a result of the comparison, the interactive server 100 may perform a search with the stored query data. In response to the analysis result not being stored in the memory cache, the interactive server 100 may perform a natural language processing regarding the received voice data and perform a search according to the process result.

For example, in response to the user's voice, "search A," being received from the user, since the interactive server 100 generates "search A" to a query data and stores in the cache memory as described above, a search regarding "A" may be performed by using the stored query data, "search A," in the interactive server 100.

The interactive server 100 transmits the search result to the display apparatus 200 (S810). The display apparatus 200 performs a function which corresponds to the user's voice (S820).

For example, by performing a search regarding 'A,' in response to the information regarding a director, running-time, a leading actor and so on 'A' and the movie 'A' can be played through the display apparatus, the information regarding the playback channel is acquired, and in response to the acquired search result is transmitted to the display apparatus 200, the display apparatus 200 may display the received search result. The display apparatus 200 may receive the user's instruction from the user for confirming the information regarding 'A' or for starting the playback of 'A.'

The method of controlling the interactive server according to an exemplary embodiment may be coded as software and be stored in a non-transitory readable storage medium. The non-transitory readable storage medium may be used by loading in various apparatuses.

The non-transitory readable medium refers to a medium which stores a data semi-permanently and is readable by an apparatus, not a media which stores a data for a short period such as a register, a cache, a memory and so on. Specifically, a CD, a DVD, a hard disk, a Blu-ray Disc™, a USB, a memory card and ROM may be the non-transitory readable storage medium.

Desirable exemplary embodiments were illustrated and explained above, but the present invention is not limited to the described exemplary embodiments. Also, the description of the exemplary embodiments is intended to be illustrative and not to limit the scope of the claims, and it would be appreciated by those skilled in the art that changes may be made to the exemplary embodiments without departing from the principles and spirit of the invention, the scope of which is defined in the appended claims.

What is claimed is:

1. A method of controlling an interactive system, the method comprising:
    parsing, by a server, a plurality of voice data received from a plurality of users;
    identifying, by the server, an utterance pattern based on the parsed plurality of voice data, and obtaining a plurality of keywords corresponding to at least one from among contents and a searching word list of a search engine;
    obtaining, by the server, query data comprising a plurality of queries by combining at least one keyword of the obtained plurality of keywords with the identified utterance pattern;
    storing, by the server, the obtained query data; and
    based on a voice data being received from a display apparatus of a user, performing, by the server, a search related to a voice of the user by comparing the voice data with the stored query data.

2. The method as claimed in claim 1, wherein the performing the search comprises:
    in response to the voice data received from the display apparatus being consistent with the one of the plurality of queries stored in a cache memory of a first server, performing the search with the one of the plurality of queries; and
    in response to the voice data received from the display apparatus being inconsistent with the one of the plurality of queries stored in the cache memory of the first server, performing natural language processing related to the voice data and performing the search according to a result of the natural language processing.

3. The method as claimed in claim 1, wherein the analyzing the utterance pattern comprises collecting utterances of the plurality of users and parsing the utterances.

4. The method as claimed in claim 3, wherein the storing comprises:
    collecting the voice of the user, analyzing the utterance pattern by parsing the voice of the user, and generating the query data by a second server; and
    receiving the query data from the second server and storing the query data in a cache memory by a first server.

5. The method as claimed in claim 4, wherein the second server performs analyzing the utterance pattern and generating the query data in response to the voice of the user being received less than a predetermined number of times.

6. The method as claimed in claim 1, wherein each keyword of the plurality of keywords is related to at least one of first content generated within a time period or second content searched more than a predetermined number of times within the time period.

7. The method as claimed in claim 1, further comprising;
    deleting, from the query data, a query which is not used for the search within a time period.

8. An interactive system comprising:
    a first server; and
    a display apparatus configured to receive a voice of a user, convert the voice to voice data and transmit the voice data to the first server,
    wherein the first server is configured to:
        parse a plurality of voice data received from a plurality of users,
        identify an utterance pattern based on the parsed plurality of voice data and obtaining a plurality of keywords corresponding to at least one from among contents and a searching word list of a search engine,
        obtain query data comprising a plurality of queries by combining at least one keyword of the obtained plurality of keywords with the identified utterance pattern,
        store the obtained query data, and
        based on the voice data being received from the display apparatus of the user, perform, by the first server, a search related to the voice of the user by comparing the voice data with the stored query data.

9. The interactive system as claimed in claim 8, wherein the first server is further configured to:
    in response to the voice data being consistent with the one of the plurality of queries stored in a cache memory, perform the search with the one of the plurality of queries; and
    in response to the voice data being inconsistent with the one of the plurality of queries stored in the cache memory, perform a natural language processing related to the voice data, and perform the search according to a result of the natural language processing.

10. The interactive system as claimed in claim 8, further comprising a second server configured to collect the voice of the user, parse the voice of the user and analyze the utterance pattern.

11. The interactive system as claimed in claim 8, further comprising a second server;
    wherein the second server is configured to collect the voice of the user, analyze the utterance pattern by parsing the voice of the user, generate the query data, and transmit the query data to the first server; and wherein the first server is further configured to receive the query data from the second server and store the received query data in a cache memory.

12. The interactive system as claimed in claim 11, wherein the second server is further configured to analyze the utterance pattern and generate the query data in response to a number of the voice of the user being less than a predetermined number.

13. The interactive system as claimed in claim 11, wherein each keyword of the plurality of keywords is related to at least one of first content generated within a time period or second content searched more than a predetermined number of times within the time period.

14. The interactive system as claimed in claim 11, wherein the first server is further configured to delete, from the query data, a query which is not used for the search within a time period.

15. The interactive system of claim 11, wherein the first server is further configured to delete, from the query data, a query which is not used for the search within a time period.

16. The interactive system of claim 8, further comprising a second server configured to compare the stored query data, and in response to the voice data being received, perform the search related to the voice of the user by comparing the voice data with the stored query data.

17. The interactive system of claim 16, wherein the second server is further configured to analyze the utterance pattern and generate the query data in response to a number of the voice of the user being less than a predetermined number.

18. The interactive system of claim 16, wherein each keyword of the plurality of keywords is related to at least one of first content generated within a time period or second content searched more than a predetermined number of times within the time period.

19. A method for controlling a server, the method comprising:
   parsing, by the server, a plurality of voice data received from a plurality of users;
   identifying, by the server, an utterance pattern based on the parsed plurality of voice data and obtaining a plurality of keywords corresponding to at least one from among contents and a searching word list of a search engine;
   obtaining, by the server, query data comprising a plurality of queries by combining at least one keyword of the obtained plurality of keywords with the identified utterance pattern;
   storing, by the server, the obtained query data;
   based on a voice data being received from a display apparatus of a user, performing, a search related to a voice of the user by comparing the voice data with the stored query data,
   in response to receiving data which corresponds to the voice of the user, determining whether the data is consistent with the stored query data;
   in response to the data being consistent with the stored query data, performing a search with the stored query data; and
   in response to the data being inconsistent with the stored query data, performing natural language processing with the data and performing the search according to a result of the natural language processing.

20. A server comprising:
   a storage;
   a communicator; and
   a controller configured to:
      parse a plurality of voice data received from a plurality of users,
      identify an utterance pattern based on the parsed plurality of voice data and obtaining a plurality of keywords corresponding to at least one from among contents and a searching word list of a search engine,
      obtain query data comprising a plurality of queries by combining at least one keyword of the obtained plurality of keywords with the identified utterance pattern,
      store the obtained query data,
      based on a voice data being received from a display apparatus of a user, perform a search related to a voice of the user by comparing the voice data with the stored query data,
      in response to receiving data which corresponds to the voice of the user through the communicator, determine whether the received data is consistent with the stored query data,
      perform a first search with the stored query data in response to the data being consistent with the stored query data, and
      perform natural language processing and perform a second search according to a result of the natural language processing in response to the data being inconsistent with the stored query data.

* * * * *